(12) United States Patent
Anderson et al.

(10) Patent No.: US 10,715,468 B2
(45) Date of Patent: Jul. 14, 2020

(54) FACILITATING TRACKING OF TARGETS AND GENERATING AND COMMUNICATING OF MESSAGES AT COMPUTING DEVICES

(71) Applicant: INTEL CORPORATION, Santa Clara, CA (US)

(72) Inventors: Glen J. Anderson, Beaverton, OR (US); Cory J. Booth, Beaverton, OR (US); Lenitra M. Durham, Beaverton, OR (US); Kathy Yuen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 225 days.

(21) Appl. No.: 14/671,020

(22) Filed: Mar. 27, 2015

(65) Prior Publication Data

US 2016/0285793 A1 Sep. 29, 2016

(51) Int. Cl.
*H04L 12/24* (2006.01)
*H04L 12/58* (2006.01)
(Continued)

(52) U.S. Cl.
CPC .......... *H04L 51/046* (2013.01); *G02B 27/017* (2013.01); *G06F 3/013* (2013.01);
(Continued)

(58) Field of Classification Search
CPC ....... H04L 51/046; H04L 51/00; H04L 51/04; G02B 27/017; G02B 2027/0138; G02B 2027/014; G02B 2027/0178; G02B 2027/0187; G06F 3/013; G06F 3/0484; G06K 9/00221; G10L 17/00
(Continued)

(56) References Cited

U.S. PATENT DOCUMENTS 7,039,221 B1 * 5/2006 Tumey ............... G06K 9/00221
382/118
8,874,129 B2 * 10/2014 Forutanpour ....... G06F 3/04883
455/456.1
(Continued)

FOREIGN PATENT DOCUMENTS

WO    WO 2015033152 A2 * 9/2014

*Primary Examiner* — Moustafa M Meky
*Assistant Examiner* — Elizabeth Kassa
(74) *Attorney, Agent, or Firm* — Womble Bond Dickinson (US) LLP

(57) ABSTRACT

A mechanism is described for dynamically facilitating tracking of targets and generating and communicating of messages at computing devices according to one embodiment. An apparatus of embodiments, as described herein, includes one or more capturing/sensing components to facilitate seeking of the apparatus, where the apparatus is associated with a user, and recognition/transformation logic to recognize the apparatus. The apparatus may further include command and data analysis logic to analyze a command received at the apparatus from the user, where the command indicates sending a message to the apparatus. The apparatus may further include message generation and preparation logic to generate the message based on the analysis of the command, and communication/compatibility logic to communicate the message.

29 Claims, 8 Drawing Sheets

(51) Int. Cl.
*G06F 3/0484* (2013.01)
*G06F 3/01* (2006.01)
*G02B 27/01* (2006.01)
*G10L 17/00* (2013.01)

(52) U.S. Cl.
CPC ............ *G06F 3/0484* (2013.01); *H04L 51/00* (2013.01); *G02B 2027/014* (2013.01); *G02B 2027/0138* (2013.01); *G02B 2027/0178* (2013.01); *G02B 2027/0187* (2013.01); *G10L 17/00* (2013.01); *H04L 51/04* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 9,112,989 | B2* | 8/2015 | Lee | G10L 25/78 |
| 10,180,572 | B2* | 1/2019 | Osterhout | G02B 27/0093 |
| 2010/0226535 | A1* | 9/2010 | Kimchi | G06F 3/013 |
| | | | | 382/103 |
| 2011/0047237 | A1* | 2/2011 | Walsh | G06Q 10/10 |
| | | | | 709/207 |
| 2011/0050568 | A1* | 3/2011 | Hu | G06F 3/012 |
| | | | | 345/157 |
| 2012/0110568 | A1* | 5/2012 | Abel | G06F 8/61 |
| | | | | 717/178 |
| 2012/0226905 | A1* | 9/2012 | Mohanty | H04L 9/0825 |
| | | | | 713/168 |
| 2013/0150117 | A1* | 6/2013 | Rodriguez | G06T 7/00 |
| | | | | 455/550.1 |
| 2014/0002343 | A1* | 1/2014 | Kennedy | G06F 3/013 |
| | | | | 345/156 |
| 2014/0106710 | A1* | 4/2014 | Rodriguez | H04M 1/7253 |
| | | | | 455/411 |
| 2014/0118520 | A1* | 5/2014 | Slaby | G06K 9/00926 |
| | | | | 348/77 |
| 2014/0337733 | A1* | 11/2014 | Rodriguez | G06F 3/04842 |
| | | | | 715/718 |
| 2015/0067580 | A1* | 3/2015 | Um | G06F 3/0481 |
| | | | | 715/781 |
| 2016/0205238 | A1* | 7/2016 | Abramson | G01C 21/3484 |
| | | | | 455/456.4 |
| 2017/0236407 | A1* | 8/2017 | Rhoads | G08C 17/02 |
| | | | | 455/420 |

* cited by examiner

FACILITATING TRACKING OF TARGETS AND GENERATING AND COMMUNICATING OF MESSAGES AT COMPUTING DEVICES

FIELD

Embodiments described herein generally relate to computers. More particularly, embodiments relate to dynamically facilitating tracking of targets and generating and communicating of messages at computing devices.

BACKGROUND

With the growth in the use of personal computing devices (e.g., smartphones, tablet computers, wearable devices, etc.), various communication techniques have been employed. However, conventional techniques provide for restricted user experiences as they require any number of pre-communication processes and tools before any communication with potential receivers can be established.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
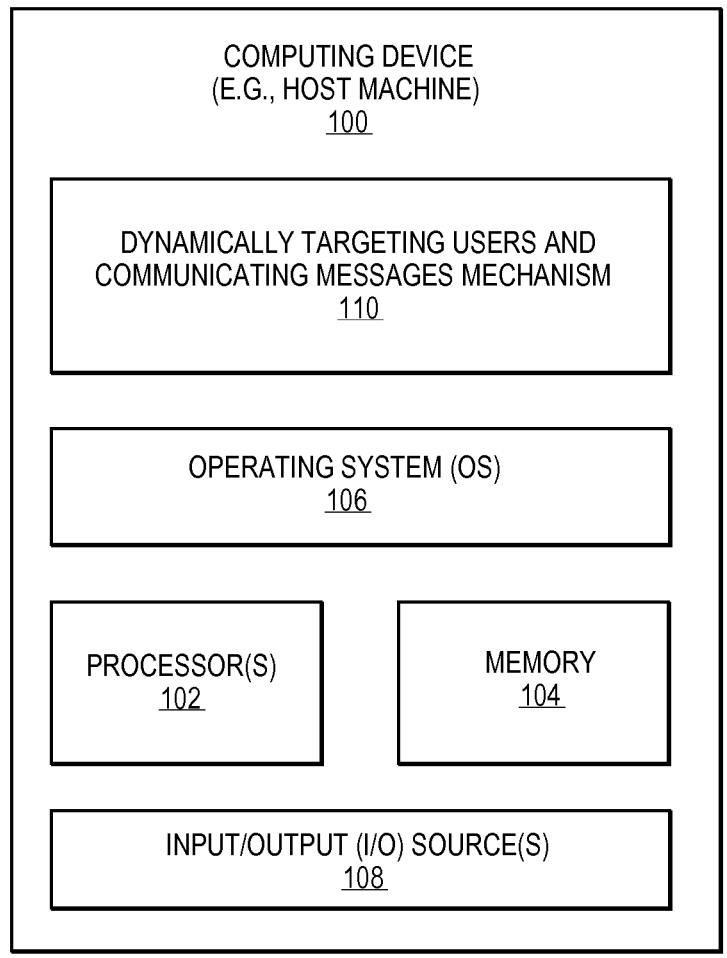
FIG. 1 illustrates a computing device employing a dynamic targeting users and communicating messages mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide a technique for tracking one or more target recipient at a distance and based on the tracking, allowing generation and communication of a message to the target recipient at a target computing device from a sender via a source computing device associated with the sender. In one embodiment, the message include any number and type of messages, such as video messages, audio messages, images, text messages, hybrid messages (e.g., audio/video combined), transforming messages (e.g., voice to text or vice versa, etc.), canned or predetermined messages, any form of gestures, and/or the like. Further, in one embodiment, the target recipient may be a receiving user who may not be known to the transmitting user, where both the receiving and transmitting users may be associated with their respective computing devices, such as mobile computers, wearable devices, etc., as will be further described in this document. This connection and communication between the receiving user and the transmitting user may be performed using one or more techniques and based on one or more factors, such as context, security, etc.

Embodiments provide for establishing communication between one or more receiving and transmitting users in any number and type of situations, such as (without limitation) in a crowded environment when a receiving user may be seen but cannot be spoken with; a potentially hazardous situation, such as a construction site, where advise or warning may be communicated with better immediacy; at a party or a similar setting, where a discreet communication may be needed or relied upon gestures; in remote cases, where a message may be generated and sent by simply thinking of a person or their family member (as opposed to the person); and/or the like.

It is to be noted that various computing devices, such as smartphones, tablet computers, wearable devices (e.g., head-mounted displays, wearable glasses, watches, wrist bands, clothing items, jewelry, etc.), and/or the like, may be collectively referred to as "personal computing devices", "personal computers", "personal devices", or simply "devices" throughout this document. Further, "receiving user" and "target user" may be referenced interchangeably; while, "sending user", "transmitting user", and "source user" may be referenced interchangeably throughout this document. Similarly, "receiving device" or "target device" may be referenced interchangeably; while, "sending device", "transmitting device", and "source device" may be referenced interchangeably through this document. Further, for example, "target", "recipient", and "receiver" may individually or collectively refer to "target user" and/or "target device"; while "source", "dispatcher", and "sender" may individually or collectively refer to "source user" and/or "source device".

FIG. 1 illustrates a computing device 100 employing a dynamic targeting users and communicating messages mechanism 110 according to one embodiment. Computing device 100 serves as a host machine for hosting dynamic targeting users and communicating messages mechanism ("target/communicate mechanism") 110 that includes any number and type of components, as illustrated in FIG. 2, to efficiently employ one or more components to dynamically facilitate targeting of recipients and sending them message via one or more personal devices without having to know the recipient or perform any of the conventional pre-messaging or pre-communicating processes as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® Glass™, head-mounted binoculars, gaming displays, military headwear, etc.), and other wearable devices (e.g., smartwatches, bracelets, smartcards, jewelry, clothing items, etc.), and/or the like.

As aforementioned, for brevity, clarity, and ease of understanding, throughout this document, "personal device" may collectively refer to any type of mobile computers, wearable devices, smart devices, HMDs, etc.; however, it is contemplated that embodiments are not limited as such to any particular type or number of computing devices.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
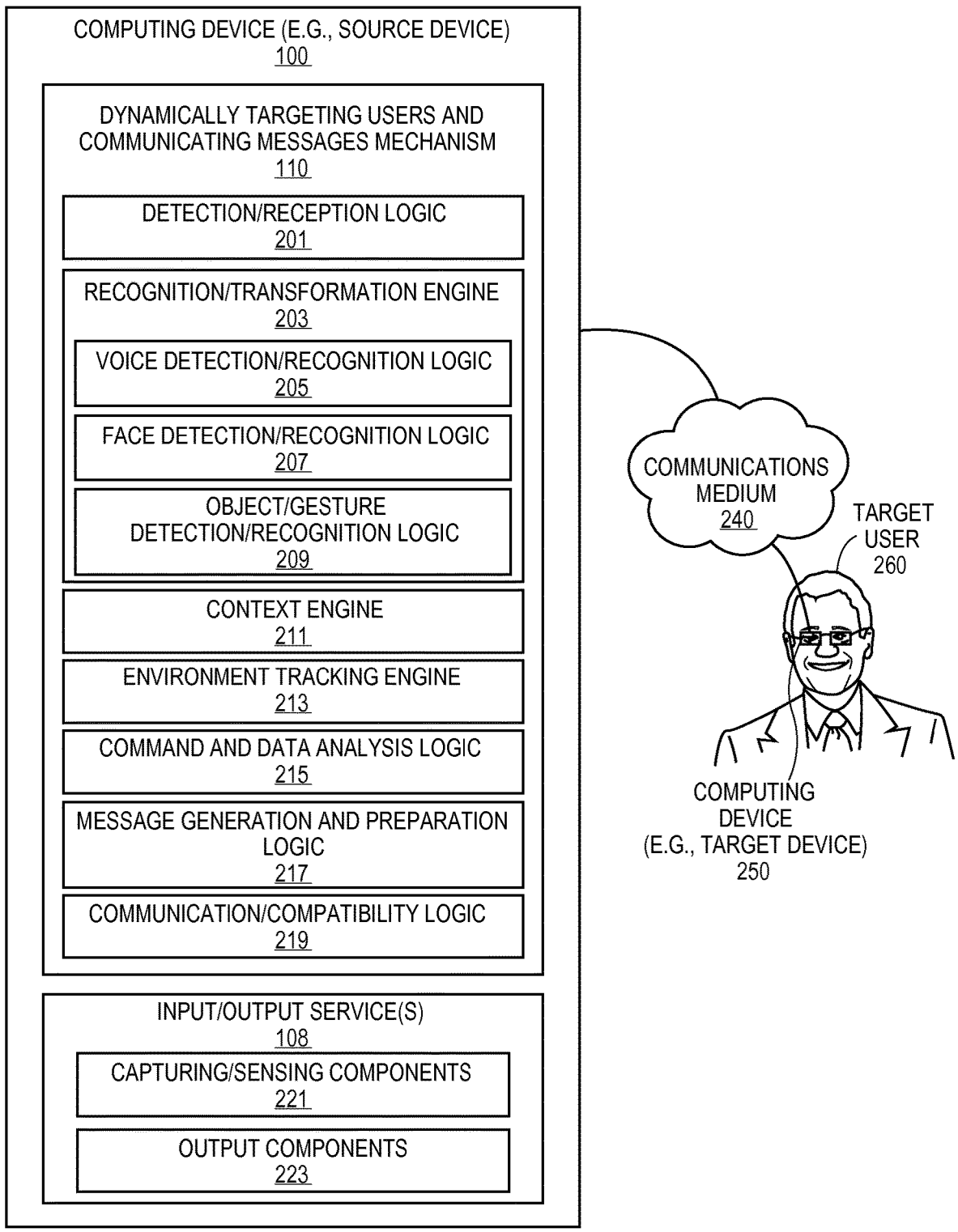
FIG. 2A illustrates a dynamic targeting users and communicating messages mechanism according to one embodiment.

FIG. 2A illustrates a dynamic targeting users and communicating messages mechanism 110 according to one embodiment. In one embodiment, target/communicate mechanism 110 may include any number and type of components, such as (without limitation): detection/reception logic 201; recognition/transformation engine 203 including voice detection/recognition logic ("voice logic") 205, face detection/recognition logic ("face logic") 207, and object/gesture detection/recognition logic ("object/gesture logic") 209; context engine 211; environment tracking engine ("environment engine") 213; command and data analysis logic ("analysis logic") 215; message generation and preparation logic ("message logic") 217; and communication/compatibility logic 219.

As an initial matter, as illustrated in one embodiment, computing device 100 may include a personal device serving as a host machine for hosting and managing target/communicate mechanism 110; however, it is contemplated that in some embodiments, one or some or all of the components of target/communicate mechanism 110 may be hosted by a server computer, such as a third-party controlled and managed server computer. Similarly, target/communicate mechanism 110 may be partially or completely hosted by any number of other computing devices, such as computing device 250 (e.g., personal device), in communication with computing device 100. However, for the sake of brevity, clarity, and ease of understanding, target/communicate mechanism 110 is shown as being hosted by computing device 100.

Computing device 100 may be in communication with one or more repositories or databases to store and maintain any amount and type of data (e.g., real-time data, historical contents, metadata, resources, policies, criteria, rules and regulations, upgrades, etc.). Similarly, as aforementioned, computing device 100 may be in communication with any number and type of other computing devices, such as computing device 250, over communications medium communications medium, such as or including one or more networks (e.g., cloud network, the Internet, intranet, Internet of Things ("IoT"), proximity network, Bluetooth, etc.). It is contemplated that embodiments are not limited to any particular number or type of communication medium or networks.

As previously disclosed, computing devices 100, 250 may include personal devices having any number and type of mobile and wearable devices, such as (without limitation) smartphones, tablet computers, wearable glasses, smart clothes, smart jewelry, smartcards, and/or the like. Throughout the document, computing devices 100, 250 may be interchangeably referenced as personal devices 100, 250. Similarly, computing device 100 and computing device 250 may be interchangeably referenced as "source device" and "target device", respectively.

In one embodiment, detection/reception logic 201 may be used to detect computing 250 and/or its associated user 260 ("target user"), where, in some embodiments, computing/target device 250 and/or the user may be authenticated and/or verified, as desired or necessitated, such as when target user 260 and the user ("source user") associated with computing/source device 100 may know each other in which case an ad hoc communication/network may be employed, such as target device 250 opting-in to communicate with source device 100.

Capturing/sensing components 221 may include any number and type of capturing/sensing devices, such as one or more sending and/or capturing devices (e.g., cameras (e.g., three-dimension (3D) cameras, etc.), microphones, vibration components, tactile components, conductance elements, biometric sensors, chemical detectors, signal detectors, electroencephalography, functional near-infrared spectroscopy, wave detectors, force sensors (e.g., accelerometers), illuminators, etc.) that may be used for capturing any amount and type of visual data, such as images (e.g., photos, videos, movies, audio/video streams, etc.), and non-visual data, such as audio streams (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 221 may further include one or more supporting or supplemental devices for capturing and/or sensing of data, such as illuminators (e.g., infrared (IR) illuminator), light fixtures, generators, sound blockers, etc.

It is further contemplated that in one embodiment, capturing/sensing components 221 may further include any number and type of sensing devices or sensors (e.g., linear accelerometer) for sensing or detecting any number and type of contexts (e.g., estimating horizon, linear acceleration, etc., relating to a mobile computing device, etc.). For example, capturing/sensing components 221 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc. Further, detection of certain brainwaves or circulation patterns may be used to select and send a message to target user 260 via target device 250. In this embodiment, the source user may initiate a thought to cause an electrical pattern in the source user's brain that correlates with a command received at source device 100 to trigger selection and sending of the message.

For example, capturing/sensing components 221 may further include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 221 may further include voice recognition devices, photo recognition devices, facial and other body recognition components, voice-to-text conversion components, etc.

Computing device 100 may further include one or more output components 223 in communication with one or more capturing/sensing components 221 and one or more components of target/communicate mechanism 110 to facilitate displaying of images, playing or visualization of sounds, displaying visualization of fingerprints, presenting visualization of touch, smell, and/or other sense-related experiences, etc. For example and in one embodiment, output components 223 may include (without limitation) one or more of light sources, display devices and/or screens (e.g., two-dimension (2D) displays, 3D displays, etc.), audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, etc.

In one embodiment, when the source user of source device 100 wishes to send a message (e.g., warning, greeting, etc.) to target user 260 of target device 250, recognition/transformation engine 203 may be used to establish communication between source and target devices 100, 250. For example, in one embodiment, a listen-to-choose-recipient technique may be employed by having voice logic 205 receive voice commands, such as any sound or noise, from several individuals, including target user 260. Further, voice logic 205 may then be used to recognize and distinguish the sounds belonging to target user 260 from other sounds to select target user 260 to send a message via target device 250 over communications medium 240 (e.g., communication network) without having the source user to even know or identify target user 260, such as without having to speak the name of target user 260 or perform any other identification and/or pre-communication processes, allowing a fast communication and efficient communication of the message from source device 100 to target device 250.

In another embodiment, a look-to-choose-recipient technique may be employed using facial recognition using one or more components (e.g., camera, eye-tracking component, etc.) of capturing/sensing components 221 of input/output sources 108. For example, in one embodiment, the source user may point or aim source device 250, such as a camera of course device 250, at target user 260 and indicate to source device 250 the desire to send a message to target user 260 which may then be generated at source device 100, via target/communicate mechanism 110, and forwarded on to target devices 250 for the benefit of target user 260. For example and in one embodiment, the source user may look at target user 260, such as via a camera of source device 100, and by spotting and concentrating on target user 260 or sending a quick message (e.g., voice message or gesture) to source device 100, the source user may indicate the desire to send a message to target user 260. This indication may trigger the camera of source device 100 to fix an image (e.g., face) of target user 260 on a frame (such as in the middle of the frame) to then be processed by face logic 207. In one embodiment, the concentration may be for a short period of time, such as 2-3 seconds. Upon fixing the image in the frame, face logic 207 may then be triggered to use one or more face recognition techniques to recognize the face of target user 260 as the one to be receiving the message from the source user via source and target devices 100, 250.

Similarly, in one embodiment, using an eye-tracking component of capturing/sensing component 221, the source user may give a command (e.g., voice command, motion gesture, push a button, electrical activity in the brain, etc.) to communicate with recognition/transformation engine 203 that communication with target user 260 is desirable. The command may be communicated to the eye-tracking component to perform its one or more tasks, such as a voice command from the source user may be received by a microphone of capturing/sensing components 221 and delivered to voice logic 205 where is recognized and subsequently, analyzed via analysis logic 215 to instruct the eye-tracking component to perform any tasks requested by the source user. Similarly, a motion gesture by the source user may be detected by the camera to subsequently trigger the eye-tracking component to perform its tasks. One the eye-tracking component is triggered, it may track the eyes of target user 260 to determine and select the user as the one to be receiving the message from the source user via source and target devices 100, 250.

In addition to voice and face recognitions, in another embodiment, object recognition may be performed to detect and identify target user 250 as the recipient. For example and in one embodiment, an object associated with and or in proximity of target user 250 may be detected using one or more capturing sensing components 221, such as a camera, and communicated on to object/gesture logic 209 to use the object to determine, identify, and locate target user 250 as the recipient. An object may include any number and type of things, plants, persons, animals, etc., associated with or in proximity of target user 260, such as a hat or a tie of target user 260, a window or a painting behind target user 260, a person or an animal or a tree next to target user 260, etc. In one embodiment, the object may be used as a point of reference to detect target user 260 and then, for example, the face of target user 260 may be detected via face logic 207.

In one embodiment, any of the commands placed by the source user, such as any commands to indicate the desire to send a message to target user 260, may be analyzed and evaluated by analysis logic 215 so that proper tasks may be performed. For example, if the user places a voice command to indicate the desire to send a message, analysis logic 215 may receive the voice command from voice logic 205, analyze the voice command, and then forward it on to another component, such as context engine 211, environment engine 213, etc., for further processing in accordance with the voice command.

Once the analysis is performed and target user 260 is detected using one or more of voice, face, object, etc., any relevant information may then be provided by analysis logic 215 to context engine 211 where any context-related data relating to target user 260 may be obtained and correlated. For example, context-related data may include (without limitation) contact information of target user 260, user profile or user preferences relating to target user 260, credentials relating to target device 250, data relating to communications medium communications medium, and/or the like.

As with context engine 211, in one embodiment, environment engine 213 may be used to determine and detect any environment-related data in relating to target user 260 and/or target device 250. For example, environment-related data may indicate current weather conditions, location or surroundings of target user 260, etc., which, along with context-related data may be used to form an appropriate message to be delivered to target device 250.

In one embodiment, any context-related data associated with target user 260 and/or target device 250 may be further analyzed by analysis logic 215 to determine any factors that may be of consideration for generation and presentation of the message to target device 250. For example, if the context-related data indicates (such as based on user preferences, user profile, calendar entries, etc., relating to target user 260) that target user 260 does not prefer to receive voice message when with family, in meetings, at certain times of the day, etc., this information may be considered by analysis logic 215 to recommend to message logic 217 to automatically and dynamically convert any voice message from the source user into another form, such as text, image, or the like.

In one embodiment, in case of an emergency or under certain environmental conditions, one or more user preferences based on the context-related data may be overridden or temporarily suspended. Continuing with the above example, as further illustrated with respect to FIG. 3B, if target user 260 is (without limitation) 1) engaged in a particular activity (such as driving, at a wedding, in a meeting, etc.); 2) not likely to hear or see the message in a particular form due to certain surrounding conditions (such as thunderstorms, loud stadium, high noise party, etc.); 3) encounter an emergency (e.g., about to get hit by an object, fall into a hole, get into another form of an accident, etc.), and/or the like, analysis logic 215 may recommend message logic 217 ignore any user preferences to proceed with one or more overriding forms of delivery.

For example, in some embodiments, if target user 260 is engaged in a particular activity, such as driving an automobile or handling a machinery, etc., analysis logic 215 may recommend message logic 217 to override user preferences and generate an audio/voice message as opposed to, for example, a text message, etc., to ensure the security of target user 260, the sanctity of an event (e.g., at a funeral), and/or the like. Similarly, in some embodiments, if an emergency is imminent as inferred from the environment-related data, analysis logic 215 may recommend message logic 217 to temporarily suspend all user preferences and generate a message to be delivered to target device 250 using all forms and modalities of messaging, such as audio, video, haptic, olfactory, etc., and additionally, for example, sound a loud alarm using one or more speakers of target device 250, and/or the like, to ensure the safety of target user 260.

As aforementioned, in one embodiment, message logic 217 may receive a set of instructions, recommendations, etc., from analysis logic 215 and accordingly, generate a message and select its form of delivery so that the message may be timely and appropriately communicated from source device 100 to target device 250. Once the message has been created and its delivery method has been selected, communication/compatibility logic 219 may be triggered to deliver the message from source device 100 to target device 250 over one or more communications media 240, including one or more networks, such as (without limitation) proximity network, Bluetooth, Cloud network, etc.

In some embodiments, target/communicate mechanism 110 may be used to communicate one or more canned or pre-existing messages, such as using the look-to-choose-recipient techniques, as described above, when the source user looks or focuses/concentrates at target user 260, such as via a camera of source device 100, a canned message (e.g., "good morning", "see you soon!", "hope you are enjoying the party", etc.) may be automatically selected by message logic 217 communicated from source device 100 to target device 250.

It is contemplated that in some embodiments, the aforementioned camera or any of the other capturing/sensing components 221, output components 223, etc., may be part of source device 100 (e.g., wearable glasses, etc.) and/or in communication with source device 100, such as in case of a handheld camera, etc. In one embodiment, the source user may point or aim the camera at target user 260 and then give an indication that it is desirable to send a message to target user 260 via target device 250, where the indication from the source user to source device 100 may include (without limitation) a voice command, a gesture command, a biometric command, or simply pressing of a button or clicking on an icon, etc.

Further, in some embodiments, when the source user and target user 260 are unknown to each other, some form of ad hoc network or system, such as via detection/reception logic 201, may be provided for the source user and/or target user 260 to opt-in to participate and be part of the various functionalities of target/communicate mechanism 110. For example, at a crowded place like a sports stadium, vendors, like a popcorn vendor, may be regarded as target users, such as target user 260, having/wearing target devices, such as target device 250 (e.g., wearable glasses, smartwatch, etc.), where the spectators may be regarded as source users having/wearing source devices, such as source device 100 (e.g., wearable glasses, wearable binoculars, etc.). It is contemplated and to be noted that the roles of target and source users may be reversed, such that the spectators may be regarded as target users and the vendors may serve as the source users, and/or the like.

Now, in some embodiments, an anonymous address may be associated with an image of each of target user 260 and/or the source user 100 such as, for example, during a baseball game, a source user (such as a fan seated in seat A7) associated with source device 100 may look at a popcorn vendor serving as target user 260 via source device 100 and signals his desire to send a message to target user 250 to buy a bag of popcorn facilitating, for example, an image of the face of target user 260 matching with a corresponding address, allowing the message to go through. In one embodiment, the source user (at seat A7) may convey a message to target user 260 via source and target devices 100, 250 that the source user is paying for a popcorn bag to be delivered to another spectator (at seat B14), where this another spectator may be another participating source user or simply a non-participating spectator.

In some embodiments, as aforementioned, using motion gestures to send canned messages while looking at another target user 260, the source user may signal a desire to send a message to target user 260 via target device 250. In this case, in one embodiment, the source user may select a message by making a motion gesture (such as a predefined thumps up, snap of fingers, wave, etc.) that may be detected by, for example, a wrist worn accelerometer associated with the source user and/or source device 100 and the message corresponding to the motion gesture may then be sent. Similarly, motion gestures may be captured by another number of other capturing/sensing components 221 of source device 100, such as cameras, motion sensors, etc.

In some embodiments, context-related data may influence what messages are communicated between source and target devices 100, 250, such as messages relating to whether I know the person I am sending to, whether the person and I came to an event together and need to meet somewhere, whether I am driving or walking, and/or the like, as facilitated by one or more components of target/communicate mechanism 110, such as context engine 211.

In some embodiments, as aforementioned, messages may be created and sent by various modalities, such as voice, image, motion gesture, touch gesture, and/or the like, as facilitated by various components of target/communicate mechanism 110, such as message logic 217, and provided via one or more of capturing/sensing and output components 221, 223.

Further, in some embodiments, there may be a security aspect established as part of one or more components of target/communicate mechanism 110, such as detection/reception logic 201, recognition/transformation engine 203, analysis logic 215, etc., where a message may only be initiated and communicated between source device 100 and target device 250 if, for example, target user 260 knows the source user and vice versa as provided in user preferences submitted by target user 260. It is contemplated and as aforementioned, any number of such user preferences relating to source user and/or target user 260 and similarly, features and limitations associated with source and target devices 100, 250 may be taken into consideration by target/communicate mechanism 110.

As previously described, in one embodiment, target device 250 may also employ similar to or the same as one or more or all of the components of target/communicate mechanism 110 along with other relevant components, such as similar to or the same as capturing/sensing components 221 and output components 223 of source device 100. For example, the message received at target device 250 may be delivered to target user 260 via one or more output components (e.g., speakers, display screen, haptic and/or olfactory delivery components, etc.) of target device 250.

Communication/compatibility logic 219 may be used to facilitate dynamic communication and compatibility between computing devices 100, 250 and any number and type of other computing devices (such as wearable computing devices, mobile computing devices, desktop computers, server computing devices, etc.), processing devices (e.g., central processing unit (CPU), graphics processing unit (GPU), etc.), capturing/sensing components 221 (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), communications medium 240 (e.g., one or more networks, such as Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "personal device", "smart device", "mobile computer", "wearable device", "Head-Mounted Display" or "HDM", "face recognition", "voice recognition", "gesture recognition", "messages", "source user", "source device", "target user", "target device", etc., should not be read to limit embodiments to software or devices that carry that label in products or in literature external to this document.

It is contemplated that any number and type of components may be added to and/or removed from target/communicate mechanism 110 to facilitate various embodiments including adding, removing, and/or enhancing certain features. For brevity, clarity, and ease of understanding of target/communicate mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
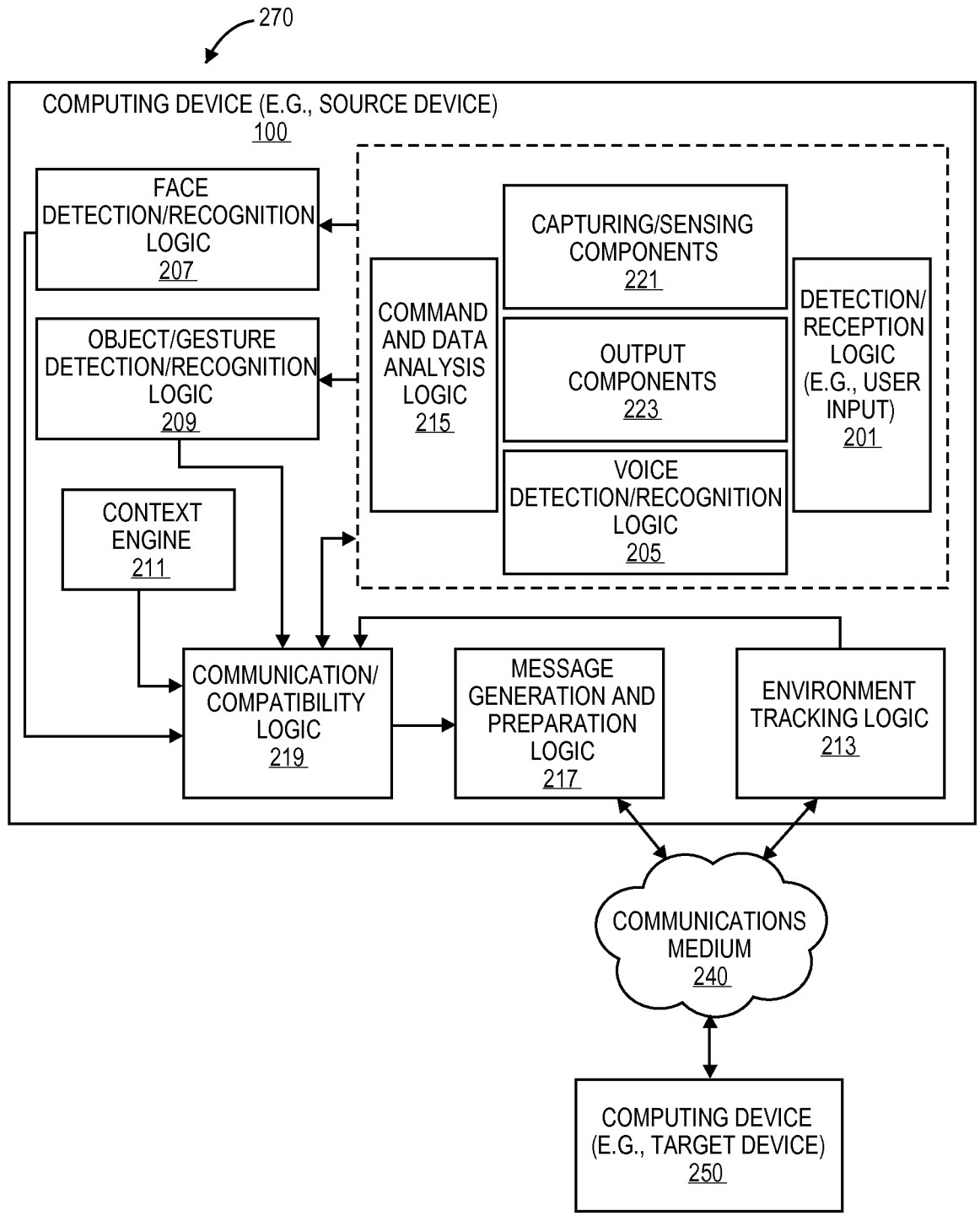
FIG. 2B illustrates an architectural placement of a selective set of components of a dynamic targeting users and communicating messages mechanism according to one embodiment.

FIG. 2B illustrates an architectural placement 270 of a selective set of components of target/communicate mechanism 110 of FIG. 2A according to one embodiment. For brevity, many of the details discussed with reference to FIGS. 1 and 2A may not be discussed or repeated hereafter. It is contemplated and to be noted that embodiments are not limited to the illustrated architectural placement, whether it be in terms of the illustrated components or their placement, and that this placement is merely provided as an example for brevity, clarity, and ease understanding.

As illustrated and in embodiment, architectural placement 270 includes computing device 100 (e.g., source device) having a set of components 280 including capturing/sensing components 221, output components 223, detection/reception logic 201, and analysis logic 215. This set of components 280 is shown to be in communication with face logic 207 and object/gesture logic 209 that are further in communication with communication/compatibility logic 219 which may also be directly in communication with set of components 280. Further, as illustrated, context engine 211 may be in communication with communication/compatibility logic 219 which is further in communication with message logic 217 and environment engine 213. In one embodiment, computing device 100 may be in communication with another computing device 250 (e.g., target device) over communications medium 240.

Figure 3A:
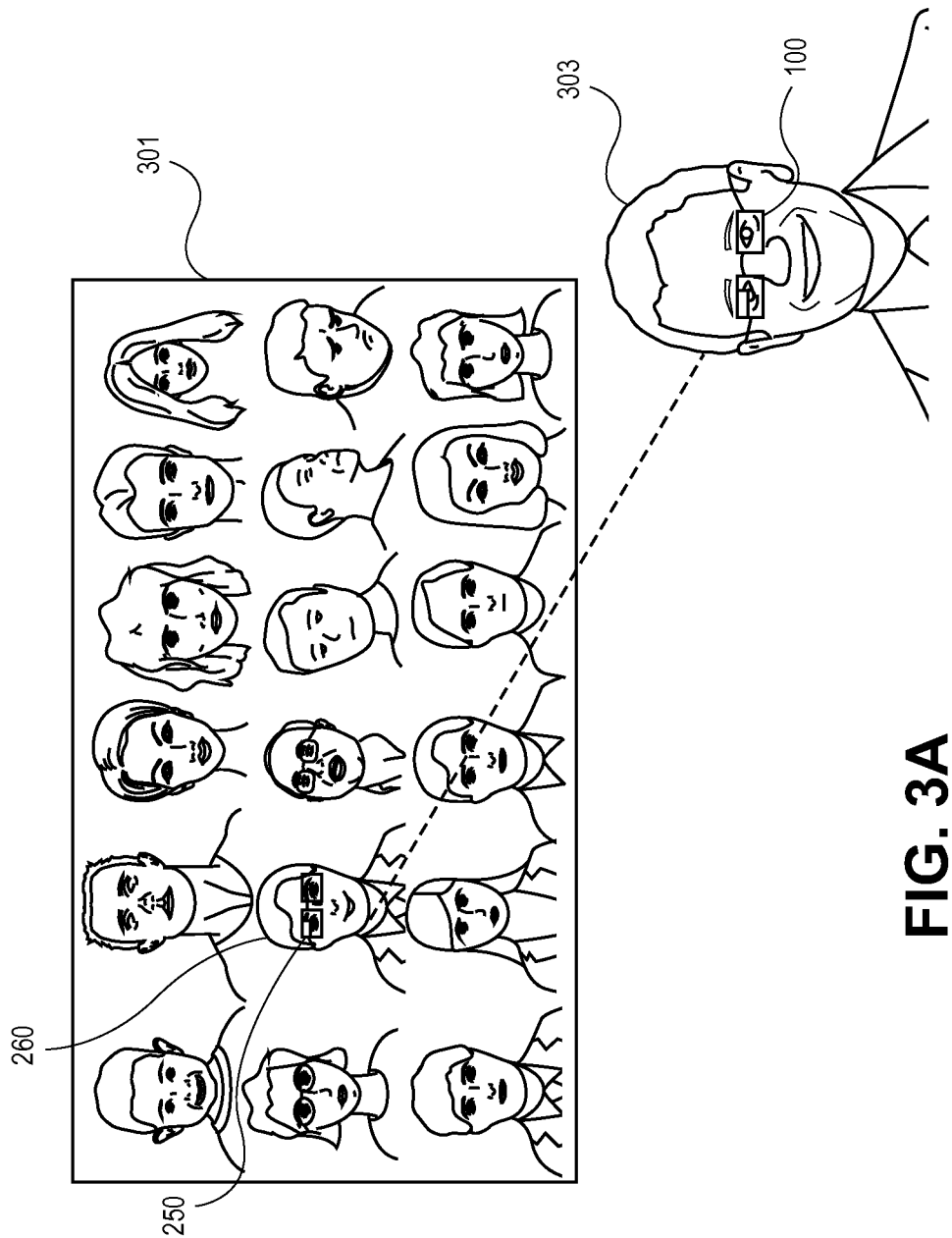
FIG. 3A illustrates a scenario having computing device for communication of messages according to one embodiment.

FIG. 3A illustrates a scenario having computing device 100, 250 for communication of messages according to one embodiment. For brevity, many of the details discussed with reference to FIGS. 1-2B may not be discussed or repeated hereafter. It is contemplated and to be noted that embodiments are not limited to this particular illustration and that this is merely provided as an example for brevity, clarity, and ease understanding.

As illustrated, in embodiment, source user 303 wearing source device 100 may spot and look at an individual, target user 260, who may just be one person amongst a large number of people, such as crowd 301. As previously described with reference to FIG. 2A, source user 303 may choose to communicate with target user 260 by, for example, briefly focusing on target user 260 (such as via a camera of source device 100) leading to detection of target user 260 and subsequently, source user 303 may send a command (e.g., voice command) to source device 100 to prepare to send a message to target user 260 via target device 250. As described with reference to FIG. 2A, using target/communicate mechanism 110, a message may be prepared at source device 100 and sent to target device 250 in any number and type of presentation formats and modalities, such as text, image, video, audio, sounds, image, haptic, olfactory, etc.

Figure 3B:
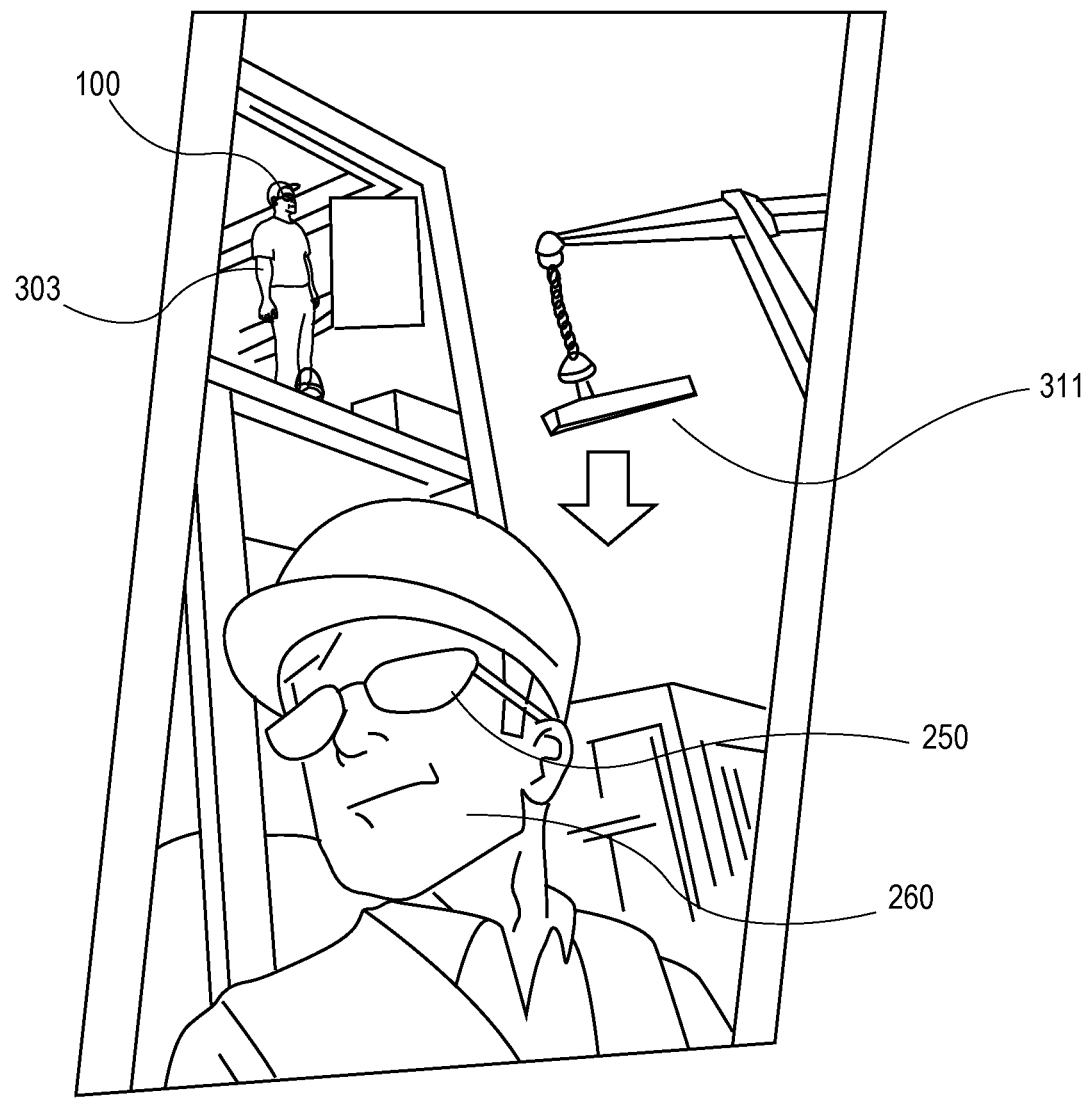
FIG. 3B illustrates an emergency scenario having computing device for communication of messages according to one embodiment.

FIG. 3B illustrates an emergency scenario having computing device 100, 250 for communication of messages according to one embodiment. For brevity, many of the details discussed with reference to FIGS. 1-3A may not be discussed or repeated hereafter. It is contemplated and to be noted that embodiments are not limited to this particular illustration and that this is merely provided as an example for brevity, clarity, and ease understanding.

The illustrated embodiment refers to an emergency situation where, as previously mentioned with regard to FIG. 2A, many of the protocols, user preferences, etc., may be suspended for the message to be communicated. For example, as illustrated, the emergency scenario may be a construction site where source user 303, associated with source device 100, sees target user 260, associated with target device 250, as possibly in the way of getting hit by a falling or potentially falling beam 311. Given the emergency nature of the situation, source user 303 may look at target user 260 and immediately commence the message generation and communication process using target/communicate mechanism 110 of FIG. 2A which may bypass several protocols and preferences to quickly generate an emergency message and get it through to target user 260, via target device 250, so that target user 260 may get out of the way of the falling beam.

Figure 6:
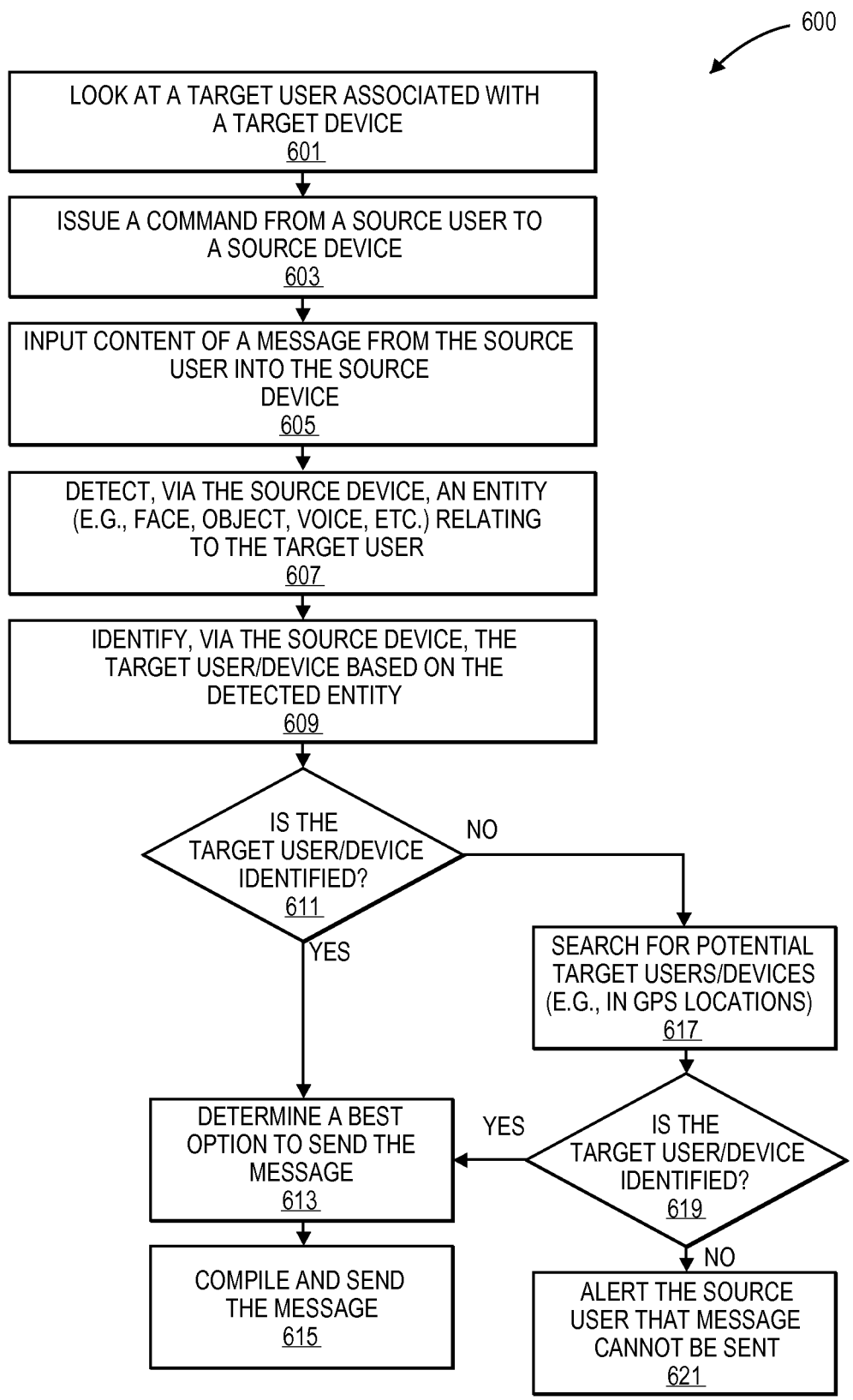
FIG. 6 illustrates a method for facilitating dynamic targeting of users and communicating of message according to one embodiment.

Referring now to FIG. 6, it illustrates a method 600 for facilitating dynamic targeting of users and communicating of message according to one embodiment. Method 600 may be performed by processing logic that may comprise hardware (e.g., circuitry, dedicated logic, programmable logic, etc.), software (such as instructions run on a processing device), or a combination thereof. In one embodiment, method 600 may be performed by target/communicate mechanism 110 of FIGS. 1-2. The processes of method 600 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 600 begins at block 601 with a source user associated with a source device looking at a target user associated with a target device, where the target user is a potential message recipient. At block 603, the source user may issue a command to the source device to indicate that the source user wishes to send a message to the target user. At block 605, the source user input into the source device any contents to be potentially used for generating the message. At block 607, at the source device, at least one entity including a face, an object, a voice, etc., relating to the target user is detected. At block 609, the detected entity is then identified.

At block 611, in one embodiment, a determination is made as to whether the target user and/or device is identified based on, for example, the detected entity. If yes, the process continues at block 613 with determination of a best option of sending the message to the target user via the target device. At block 615, the message is compiled at the source device and sent to the target user, via the target device and over a communication medium (e.g., network), using the best option.

Referring back to block 611, if the target user/device is not identified, at block 617, a search for any potential target users/devices is performed (e.g., using GPS location). At block 619, another determination is made as to whether the target user/device is now identified using the search of block 617. If yes, the process then continues at block 613 with determination of the best option to send the message and, at block 615, the message is compiled sent to the target user, via the target device and over a communications medium, using the best option. If, however, the potential target user/device is not identified, the process ends at block 621 with alerting the source user that the message cannot be sent to the target user/device.

Figure 4:
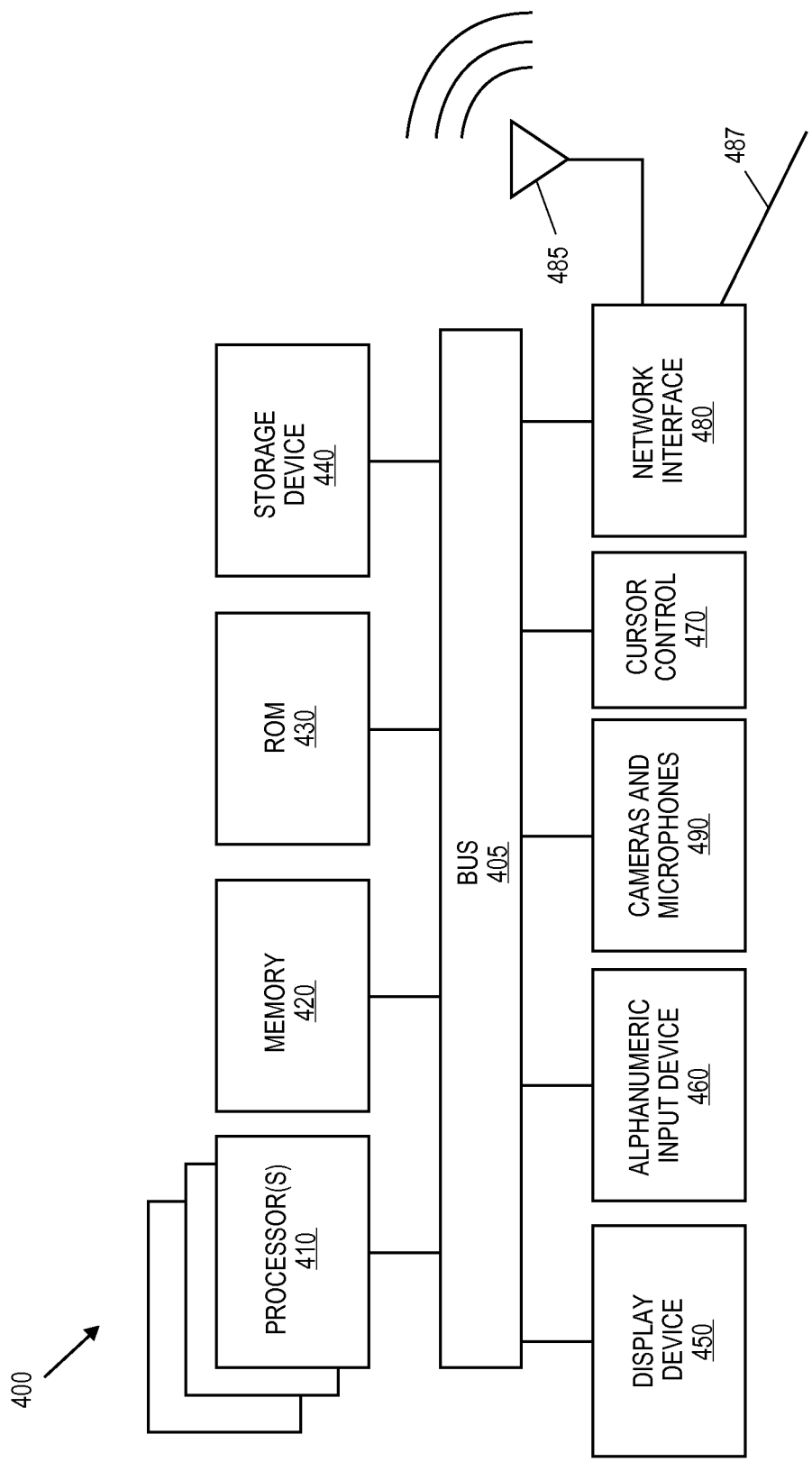
FIG. 4 illustrates computer system suitable for implementing embodiments of the present disclosure according to one embodiment.

Now referring to FIG. 4, it illustrates an embodiment of a computing system 400 capable of supporting the operations discussed above. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 400 may be the same as or similar to or include computing devices 100 described in reference to FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, it may include multiple processors and/or co-processors, such as one or more of central processors, image signal processors, graphics processors, and vision processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 5:
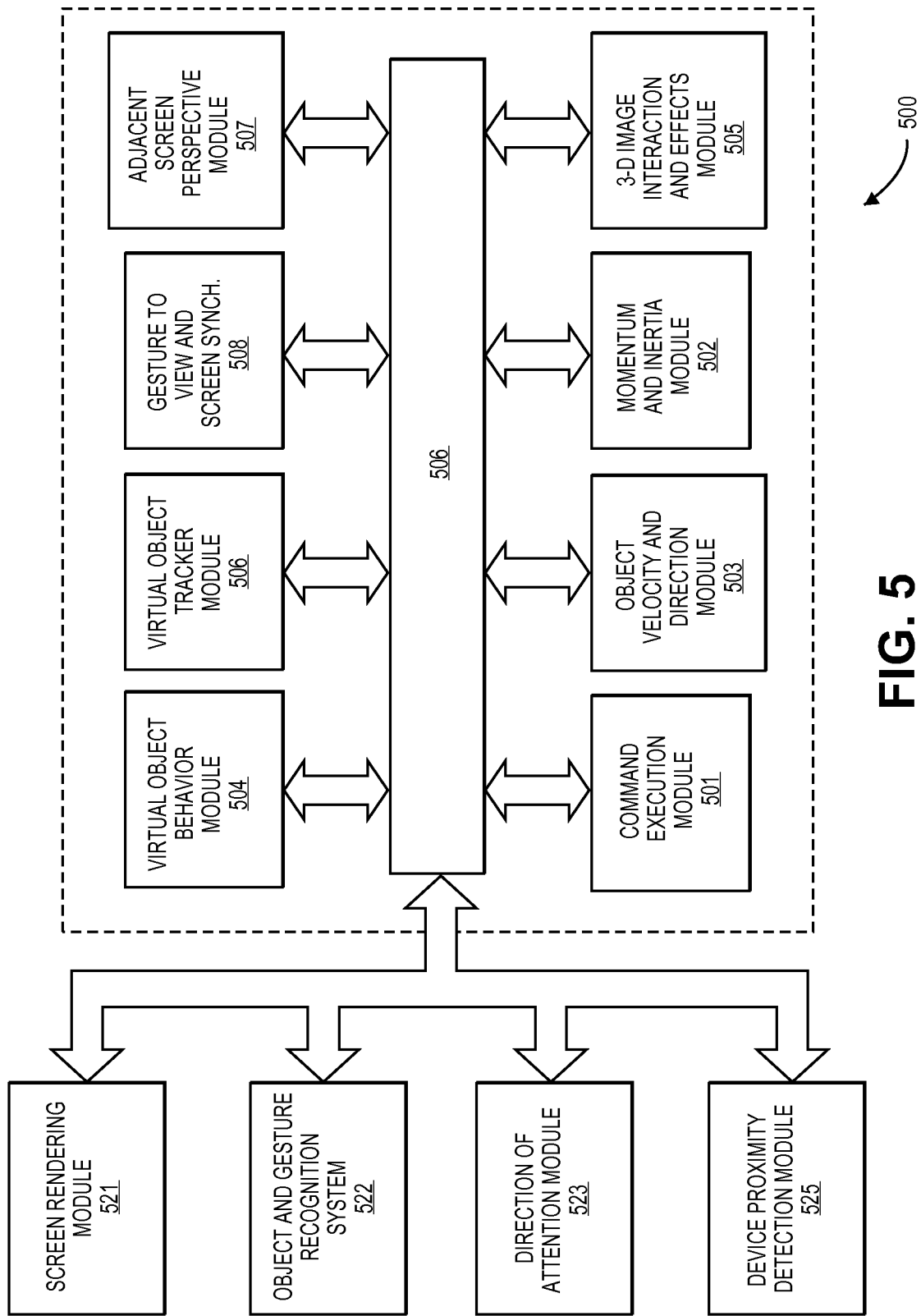
FIG. 5 illustrates computer environment suitable for implementing embodiments of the present disclosure according to one embodiment.

FIG. 5 illustrates an embodiment of a computing environment 500 capable of supporting the operations discussed above. The modules and systems can be implemented in a variety of different hardware architectures and form factors including that shown in FIG. 4.

The Command Execution Module 501 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 521 draws objects on the one or more multiple screens for the user to see. It can be adapted to receive the data from the Virtual Object Behavior Module 504, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 507, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 522 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 523 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 522 to ensure that the gestures or commands are associated with the appropriate library for the active display. Similarly, if the user is looking away from all of the screens, then commands can be ignored.

The Device Proximity Detection Module 525 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 522. For a display device, it may be considered by the Adjacent Screen Perspective Module 507.

The Virtual Object Behavior Module 504 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 506 on the other hand may be adapted to track where a virtual object should be located in three dimensional space in a vicinity of an display, and which body part of the user is holding the virtual object, based on input from the Object and Gesture Recognition Module. The Virtual Object Tracker Module 506 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 508, receives the selection of the view and screen or both from the Direction of Attention Module 523 and, in some cases, voice commands to determine which view is the active view and which screen is the active screen. It then causes the relevant gesture library to be loaded for the Object and Gesture Recognition System 522. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 507, which may include or be coupled to the Device Proximity Detection Module 525, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 507 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 503 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 502 can use image motion, image size, and angle changes of objects in the image plane or in a three-dimensional space to estimate the velocity and direction of objects in the space or on a display. The Momentum and Inertia Module is coupled to the Object and Gesture Recognition System 522 to estimate the velocity of gestures performed by hands, fingers, and other body parts and then to apply those estimates to determine momentum and velocities to virtual objects that are to be affected by the gesture.

The 3D Image Interaction and Effects Module 505 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to dynamically facilitate tracking of targets and generating and communicating of messages at computing devices, comprising: one or more capturing/sensing components of a first computing device to facilitate seeking of a second computing device, wherein the first computing device and the second computing device are associated with a first user and a second user, respectively; recognition/transformation logic to recognize the second computing device; command and data analysis logic to analyze a command received at the first computing device from the first user, wherein the command indicates sending a message to the second computing device; message generation and preparation logic to generate the message based on the analysis of the command; and communication/compatibility logic to communicate the message from the first computing to the second computing device.

Example 2 includes the subject matter of Example 1, further comprising detection/reception logic to detect, via the one or more capturing/sensing components, at least one of the second computing device and the second user, wherein the one or more capturing/sensing components include at least one of a camera, a microphone, one or more tracking components, and one or more sensors.

Example 3 includes the subject matter of Example 1 or 2, wherein the camera to focus on a face of the second user to trigger face detection/recognition logic to recognize the second user, wherein the one or more tracking components including an eye-tracking component to track an eye of the second user.

Example 4 includes the subject matter of Example 1 or 2, wherein the microphone to focus on a voice of the second user to trigger voice detection/recognition logic to recognize the second user.

Example 5 includes the subject matter of Example 1 or 2, wherein the one or more sensors to sense one or more objects associated with the second user to trigger object/gesture detection/recognition logic to recognize the second user.

Example 6 includes the subject matter of Example 1, further comprising context engine to determine, in real-time, context relating to at least one of the second user and the second computing device, wherein the context includes activity data relating to at least one of the second user and the second computing device.

Example 7 includes the subject matter of Example 1, further comprising environment tracking engine to track, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

Example 8 includes the subject matter of Example 1, wherein the message generation and preparation logic is further to generate the message based on at least one of the context and the environmental conditions.

Example 9 includes the subject matter of Example 1, wherein the first computing device and the second computing device include a source device and a target device, respectively, and wherein the first user and the second user include a source user and a target user, respectively, wherein the message is communicated to be presented at the second computing device.

Example 10 includes the subject matter of Example 1, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

Some embodiments pertain to Example 11 that includes a method for dynamically facilitating tracking of targets and generating and communicating of messages at computing devices, comprising: seeking, via one or more capturing/sensing components of a first computing device, a second computing device, wherein the first computing device and the second computing device are associated with a first user and a second user, respectively; recognizing the second computing device; analyzing a command received at the first computing device from the first user, wherein the command indicates sending a message to the second computing device; generating the message based on the analysis of the command; and communicating the message from the first computing to the second computing device.

Example 12 includes the subject matter of Example 11, further comprising detecting, via the one or more capturing/sensing components, at least one of the second computing device and the second user, wherein the one or more capturing/sensing components include at least one of a camera, a microphone, one or more tracking components, and one or more sensors.

Example 13 includes the subject matter of Example 11 or 12, further comprising focusing, via the camera, on a face of the second user, wherein focusing triggers recognition of the second user, wherein the one or more tracking components including an eye-tracking component to track an eye of the second user.

Example 14 includes the subject matter of Example 11 or 12, further comprising focusing, via the microphone, on a voice of the second user, wherein focusing triggers recognition of the second user.

Example 15 includes the subject matter of Example 11 or 12, further comprising sensing, via the one or more sensors, one or more objects associated with the second user, wherein sensing triggers recognition of the second user.

Example 16 includes the subject matter of Example 11, further comprising determining, in real-time, context relating to at least one of the second user and the second computing device, wherein the context includes activity data relating to at least one of the second user and the second computing device.

Example 17 includes the subject matter of Example 11, further comprising tracking, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

Example 18 includes the subject matter of Example 11, further comprising generating the message based on at least one of the context and the environmental conditions.

Example 19 includes the subject matter of Example 11, wherein the first computing device and the second computing device include a source device and a target device, respectively, and wherein the first user and the second user include a source user and a target user, respectively, wherein the message is communicated to be presented at the second computing device.

Example 20 includes the subject matter of Example 11, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

Some embodiments pertain to Example 21 includes a system comprising a storage device having instructions, and a processor to execute the instructions to facilitate a mechanism to perform one or more operations comprising: seeking, via one or more capturing/sensing components of a first computing device, a second computing device, wherein the first computing device and the second computing device are associated with a first user and a second user, respectively; recognizing the second computing device; analyzing a command received at the first computing device from the first user, wherein the command indicates sending a message to the second computing device; generating the message based on the analysis of the command; and communicating the message from the first computing to the second computing device.

Example 22 includes the subject matter of Example 21, wherein the one or more operations further comprise detecting, via the one or more capturing/sensing components, at least one of the second computing device and the second user, wherein the one or more capturing/sensing components include at least one of a camera, a microphone, one or more tracking components, and one or more sensors.

Example 23 includes the subject matter of Example 21 or 22, wherein the one or more operations further comprise focusing, via the camera, on a face of the second user, wherein focusing triggers recognition of the second user, wherein the one or more tracking components including an eye-tracking component to track an eye of the second user.

Example 24 includes the subject matter of Example 21 or 22, wherein the one or more operations further comprise focusing, via the microphone, on a voice of the second user, wherein focusing triggers recognition of the second user.

Example 25 includes the subject matter of Example 21 or 22, wherein the one or more operations further comprise sensing, via the one or more sensors, one or more objects associated with the second user, wherein sensing triggers recognition of the second user.

Example 26 includes the subject matter of Example 21, wherein the one or more operations further comprise determining, in real-time, context relating to at least one of the second user and the second computing device, wherein the context includes activity data relating to at least one of the second user and the second computing device.

Example 27 includes the subject matter of Example 21, wherein the one or more operations further comprise tracking, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

Example 28 includes the subject matter of Example 21, wherein the one or more operations further comprise generating the message based on at least one of the context and the environmental conditions.

Example 29 includes the subject matter of Example 21, wherein the first computing device and the second computing device include a source device and a target device, respectively, and wherein the first user and the second user include a source user and a target user, respectively, wherein the message is communicated to be presented at the second computing device.

Example 30 includes the subject matter of Example 21, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

Some embodiments pertain to Example 31 includes an apparatus comprising: means for seeking, via one or more capturing/sensing components of a first computing device, a second computing device, wherein the first computing device and the second computing device are associated with a first user and a second user, respectively; means for recognizing the second computing device; means for analyzing a command received at the first computing device from the first user, wherein the command indicates sending a message to the second computing device; means for generating the message based on the analysis of the command; and means for communicating the message from the first computing to the second computing device.

Example 32 includes the subject matter of Example 31, further comprising means for detecting, via the one or more capturing/sensing components, at least one of the second computing device and the second user, wherein the one or more capturing/sensing components include at least one of a camera, a microphone, one or more tracking components, and one or more sensors.

Example 33 includes the subject matter of Example 31 or 32, further comprising means for focusing, via the camera, on a face of the second user, wherein focusing triggers recognition of the second user, wherein the one or more tracking components including an eye-tracking component to track an eye of the second user.

Example 34 includes the subject matter of Example 31 or 32, further comprising means for focusing, via the microphone, on a voice of the second user, wherein focusing triggers recognition of the second user.

Example 35 includes the subject matter of Example 31 or 32, further comprising means for sensing, via the one or more sensors, one or more objects associated with the second user, wherein sensing triggers recognition of the second user.

Example 36 includes the subject matter of Example 31, further comprising means for determining, in real-time, context relating to at least one of the second user and the second computing device, wherein the context includes activity data relating to at least one of the second user and the second computing device.

Example 37 includes the subject matter of Example 31, further comprising means for tracking, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

Example 38 includes the subject matter of Example 31, further comprising means for generating the message based on at least one of the context and the environmental conditions.

Example 39 includes the subject matter of Example 31, wherein the first computing device and the second computing device include a source device and a target device, respectively, and wherein the first user and the second user include a source user and a target user, respectively, wherein the message is communicated to be presented at the second computing device.

Example 40 includes the subject matter of Example 31, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

Some embodiments pertain to Example 41 includes an apparatus comprising: one or more capturing/sensing components to facilitate seeking of the apparatus, wherein the apparatus is associated with a user; recognition/transformation logic to recognize the apparatus; command and data analysis logic to analyze a command received at the apparatus from the user, wherein the command indicates sending a message to the apparatus; message generation and preparation logic to generate the message based on the analysis of the command; and communication/compatibility logic to communicate the message.

Example 42 includes the subject matter of Example 41, further comprising detection/reception logic to detect, via the one or more capturing/sensing components, at least one of the apparatus and the user, wherein the one or more capturing/sensing components include at least one of a camera, a microphone, one or more tracking components, and one or more sensors.

Example 43 includes the subject matter of Example 42, wherein the camera to focus on a face of the user to trigger face detection/recognition logic to recognize the user, wherein the one or more tracking components include an eye-tracking component to track an eye of the user.

Example 44 includes the subject matter of Example 42, wherein the microphone to focus on a voice of the user to trigger voice detection/recognition logic to recognize the user.

Example 45 includes the subject matter of Example 42, wherein the one or more sensors to sense one or more objects associated with the user to trigger object/gesture detection/recognition logic to recognize the user.

Example 46 includes the subject matter of Example 41, further comprising context engine to determine, in real-time, context relating to at least one of the user and the apparatus, wherein the context includes activity data relating to at least one of the user and the apparatus.

Example 47 includes the subject matter of Example 41, further comprising environment tracking engine to track, in real-time, environmental conditions relating to at least one of the user and the apparatus, wherein the environmental conditions include surrounding activities relating to one or more entities in proximity of the user and the apparatus, wherein the one or more entities include one or more of weather, traffic, and physical structures.

Example 48 includes the subject matter of Example 41, wherein the message generation and preparation logic is further to generate the message based on at least one of the context and the environmental conditions.

Example 49 includes the subject matter of Example 41, wherein the apparatus comprises a mobile computing device including one or more of smartphones, tablet computers, laptops, head-mounted displays, head-mounted gaming displays, wearable glasses, wearable binoculars, smart jewelry, smartwatches, smartcards, and smart clothing items.

Example 50 includes the subject matter of Example 49, wherein the apparatus further comprises at least one of a source device and a target device, and wherein the user comprises at least one of a source user and a target user.

Some embodiments pertain to Example 51 includes a method comprising: facilitating seeking of an apparatus, wherein the apparatus is associated with a user; recognizing the apparatus; analyzing a command received at the apparatus from the user, wherein the command indicates sending a message to the apparatus; generating the message based on the analysis of the command; and communicating the message.

Example 52 includes the subject matter of Example 51, further comprising detecting, via the one or more capturing/sensing components, at least one of the apparatus and the user, wherein the one or more capturing/sensing components include at least one of a camera, a microphone, one or more tracking components, and one or more sensors.

Example 53 includes the subject matter of Example 52, wherein the camera to focus on a face of the user to trigger recognition of the user, wherein the one or more tracking components include an eye-tracking component to track an eye of the user.

Example 54 includes the subject matter of Example 52, wherein the microphone to focus on a voice of the user to trigger recognition of the user.

Example 55 includes the subject matter of Example 52, wherein the one or more sensors to sense one or more objects associated with the user to trigger recognition of the user.

Example 56 includes the subject matter of Example 51, further comprising determining, in real-time, context relating to at least one of the user and the apparatus, wherein the context includes activity data relating to at least one of the user and the apparatus.

Example 57 includes the subject matter of Example 51, further comprising tracking, in real-time, environmental conditions relating to at least one of the user and the apparatus, wherein the environmental conditions include surrounding activities relating to one or more entities in proximity of the user and the apparatus, wherein the one or more entities include one or more of weather, traffic, and physical structures.

Example 58 includes the subject matter of Example 51, further comprising generating the message based on at least one of the context and the environmental conditions.

Example 59 includes the subject matter of Example 51, wherein the apparatus comprises a mobile computing device including one or more of smartphones, tablet computers, laptops, head-mounted displays, head-mounted gaming displays, wearable glasses, wearable binoculars, smart jewelry, smartwatches, smartcards, and smart clothing items.

Example 60 includes the subject matter of Example 59, wherein the apparatus further comprises at least one of a source device and a target device, and wherein the user comprises at least one of a source user and a target user.

Example 61 includes at least one machine-readable medium comprising a plurality of instructions, when executed on a computing device, to implement or perform a method or realize an apparatus as claimed in any preceding claims.

Example 62 includes at least one non-transitory or tangible machine-readable medium comprising a plurality of instructions, when executed on a computing device, to implement or perform a method or realize an apparatus as claimed in any preceding claims.

Example 63 includes a system comprising a mechanism to implement or perform a method or realize an apparatus as claimed in any preceding claims.

Example 64 includes an apparatus comprising means to perform a method as claimed in any preceding claims.

Example 65 includes a computing device arranged to implement or perform a method or realize an apparatus as claimed in any preceding claims.

Example 66 includes a communications device arranged to implement or perform a method or realize an apparatus as claimed in any preceding claims.

Example 67 includes at least one non-transitory or tangible machine-readable medium comprising a plurality of instructions, when executed on a computing device, to implement or perform a method as claimed in any of claims or examples 11-20 or 51-60.

Example 68 includes at least one machine-readable medium comprising a plurality of instructions, when executed on a computing device, to implement or perform a method as claimed in any of claims or examples 11-20 or 51-60.

Example 69 includes a system comprising a mechanism to implement or perform a method as claimed in any of claims or examples 11-20 or 51-60.

Example 70 includes an apparatus comprising means for performing a method as claimed in any of claims or examples 11-20 or 51-60.

Example 71 includes a computing device arranged to implement or perform a method as claimed in any of claims or examples 11-20 or 51-60.

Example 72 includes a communications device arranged to implement or perform a method as claimed in any of claims or examples 11-20 or 51-60.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising a processing device to:
    facilitate seeking of another apparatus, wherein the apparatus is associated with a first user and the other apparatus is associated with a second user;
    recognize the other apparatus and select, for engaging in communication, the other apparatus from data obtained by one or more capturing/sensing components;

analyze a command received at the apparatus from the first user to send a message to the other apparatus after recognizing and selecting the other apparatus for engaging in communication;

determine context-related data associated with the second user, wherein the context-related data comprises communication preferences associated with the second user;

generate the message based on the analysis of the command and the context-related data; and communicate the message from the apparatus to the other apparatus.

2. The apparatus of claim 1, the processing device further to detect, via the one or more capturing/sensing components, at least one of the other apparatus and the second user, wherein the one or more capturing/sensing components include at least one of a camera, a microphone, one or more tracking components, and one or more sensors.

3. The apparatus of claim 2, wherein the camera to focus on a face of the user to trigger the processing device to recognize the second user, wherein the one or more tracking components including an eye-tracking component to track an eye of the second user.

4. The apparatus of claim 2, wherein the microphone to focus on a voice of the second user to trigger the processing device to recognize the second user.

5. The apparatus of claim 2, wherein the one or more sensors to sense one or more objects associated with the second user to trigger the processing device to recognize the second user.

6. The apparatus of claim 1, further comprising a context engine to determine, in real-time, context relating to at least one of the second user and the other apparatus, wherein the context includes activity data relating to at least one of the second user and the other apparatus.

7. The apparatus of claim 1, further comprising an environment tracking engine to track, in real-time, environmental conditions relating to at least one of the second user and the other apparatus, wherein the environmental conditions include surrounding activities relating to one or more entities in proximity of the second user and the other apparatus, wherein the one or more entities include one or more of weather, traffic, and physical structures.

8. The apparatus of claim 1, wherein the processing device is further to generate the message based on at least one of the context and the environmental conditions.

9. The apparatus of claim 1, wherein the apparatus comprises a mobile computing device including one or more of: smartphones, tablet computers, laptops, head-mounted displays, head-mounted gaming displays, wearable glasses, wearable binoculars, smart jewelry, smartwatches, smartcards, or smart clothing items.

10. A method comprising:

seeking, via one or more capturing/sensing components of a first computing device, a second computing device, wherein the first computing device and the second computing device are associated with a first user and a second user, respectively;

recognizing and selecting, for engaging in communication, the second computing device from data obtained by the one or more capturing/sensing components;

analyzing a command received at the first computing device from the first user to send a message to the second computing device after recognizing and selecting the second computing device for engaging in communication;

determining context-related data associated with the second user, wherein the context-related data comprises communication preferences associated with the second user;

generating the message based on the analysis of the command and the context related data; and communicating the message from the first computing device to the second computing device.

11. The method of claim 10, further comprising detecting, via the one or more capturing/sensing components, at least one of the second computing device and the second user, wherein the one or more capturing/sensing components include at least one of a camera, a microphone, one or more tracking components, and one or more sensors.

12. The method of claim 11, further comprising focusing, via the camera, on a face of the second user, wherein focusing triggers recognition of the second user, wherein the one or more tracking components including an eye-tracking component to track an eye of the second user.

13. The method of claim 11, further comprising focusing, via the microphone, on a voice of the second user, wherein focusing triggers recognition of the second user.

14. The method of claim 11, further comprising sensing, via the one or more sensors, one or more objects associated with the second user, wherein sensing triggers recognition of the second user.

15. The method of claim 10, further comprising determining, in real-time, context relating to at least one of the second user and the second computing device, wherein the context includes activity data relating to at least one of the second user and the second computing device.

16. The method of claim 10, further comprising tracking, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

17. The method of claim 10, further comprising generating the message based on at least one of the context and the environmental conditions.

18. The method of claim 10, wherein the first computing device and the second computing device include a source device and a target device, respectively, and wherein the first user and the second user include a source user and a target user, respectively, wherein the message is communicated to be presented at the second computing device.

19. The method of claim 10, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

20. At least one machine-readable medium comprising a plurality of instructions, executed on a computing device, to facilitate the computing device to perform one or more operations comprising:

seeking, via one or more capturing/sensing components of a first computing device, a second computing device, wherein the first computing device and the second computing device are associated with a first user and a second user, respectively;

recognizing and selecting, for engaging in communication, the second computing device from data obtained by the one or more capturing/sensing components;

analyzing a command received at the first computing device from the first user to send a message to the second computing device after recognizing and selecting the second computing device for engaging in communication;

determining context-related data associated with the second user, wherein the context-related data comprises communication preferences associated with the second user;

generating the message based on the analysis of the command and the context-related data; and communicating the message from the first computing device to the second computing device.

21. The machine-readable medium of claim 20, wherein the one or more operations comprising detecting, via the one or more capturing/sensing components, at least one of the second computing device and the second user, wherein the one or more capturing/sensing components include at least one of a camera, a microphone, one or more tracking components, and one or more sensors.

22. The machine-readable medium of claim 21, wherein the one or more operations comprising focusing, via the camera, on a face of the second user, wherein focusing triggers recognition of the second user, wherein the one or more tracking components including an eye-tracking component to track an eye of the second user.

23. The machine-readable medium of claim 21, wherein the one or more operations comprising focusing, via the microphone, on a voice of the second user, wherein focusing triggers recognition of the second user.

24. The machine-readable medium of claim 21, wherein the one or more operations comprising sensing, via the one or more sensors, one or more objects associated with the second user, wherein sensing triggers recognition of the second user.

25. The machine-readable medium of claim 20, wherein the one or more operations comprising determining, in real-time, context relating to at least one of the second user and the second computing device, wherein the context includes activity data relating to at least one of the second user and the second computing device.

26. The machine-readable medium of claim 20, wherein the one or more operations comprising tracking, in real-time, environmental conditions relating to at least one of the second user and the second computing device, wherein the environmental conditions include surrounding activities relating to one or more entities in proximity of the second user and the second computing device, wherein the one or more entities include one or more of weather, traffic, and physical structures.

27. The machine-readable medium of claim 20, wherein the one or more operations comprising generating the message based on at least one of the context and the environmental conditions.

28. The machine-readable medium of claim 20, wherein the first computing device and the second computing device include a source device and a target device, respectively, and wherein the first user and the second user include a source user and a target user, respectively, wherein the message is communicated to be presented at the second computing device.

29. The machine-readable medium of claim 20, wherein the first and second computing device comprise mobile computers including one or more of smartphones, tablet computers, laptops, head-mounted displays, head-mounted gaming displays, wearable glasses, wearable binoculars, smart jewelry, smartwatches, smartcards, and smart clothing items.

* * * * *